Oct. 29, 1957 J. E. MUNN 2,811,421
CONVERSION OF METALS INTO METAL OXIDES AND HYDROXIDES
Original Filed April 10, 1947
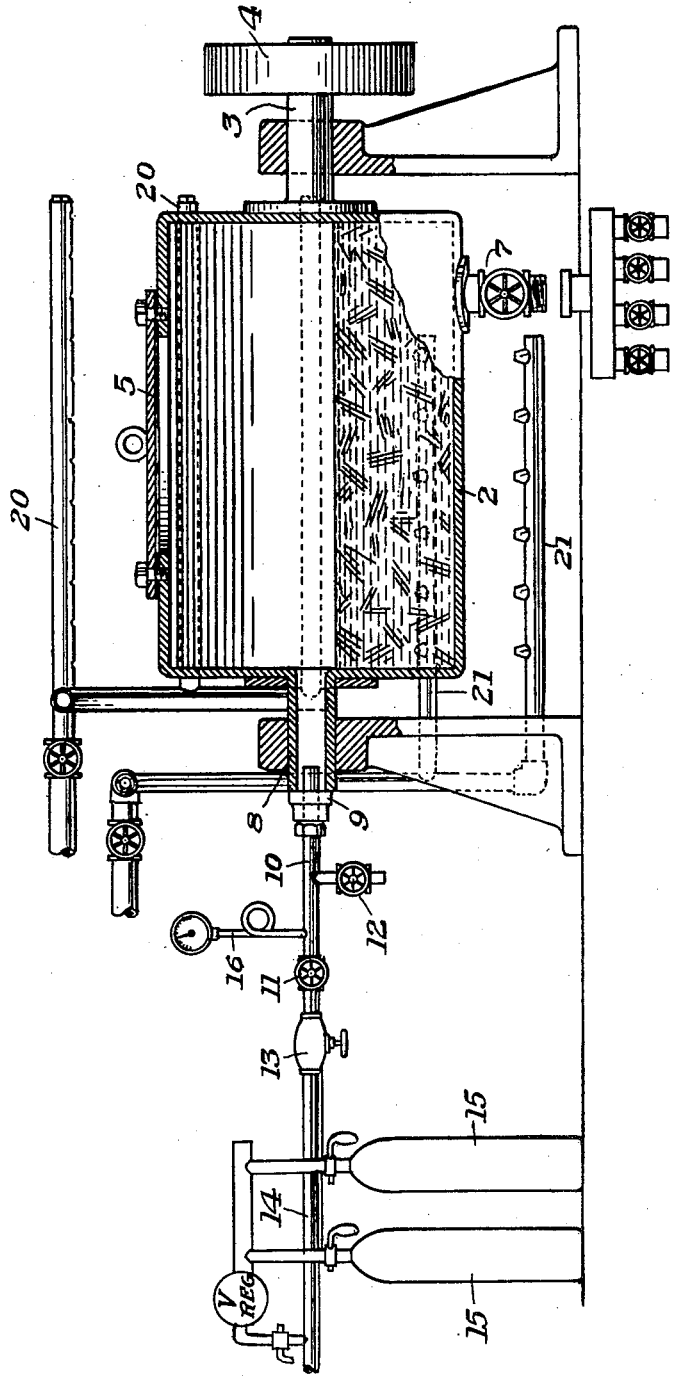
INVENTOR
John E. Munn
by Christy, Parmelee Strickland
ATTORNEYS

United States Patent Office 2,811,421
Patented Oct. 29, 1957

2,811,421

CONVERSION OF METALS INTO METAL OXIDES AND HYDROXIDES

John E. Munn, Pittsburgh, Pa.

Original application April 10, 1947, Serial No. 740,641, now Patent No. 2,670,273, dated February 23, 1954. Divided and this application February 23, 1954, Serial No. 412,043

3 Claims. (Cl. 23—200)

This invention relates to the conversion of metals into metallic compounds, and constitutes a continuation-in-part of my copending application Serial No. 488,323 filed May 25, 1943, now abandoned, and a division of my application Serial No. 740,641 filed April 10, 1947, now U. S. Patent 2,670,273.

In my copending application there is disclosed a method of converting certain metals to their oxide by the use of an amoniacal liquid in a closed environment, and I have specifically claimed a process using as the starting liquid a solution of amonium carbonate-carbamate. This solution is entirely satisfactory for my metals, but is not satisfactory for producing iron oxide or iron compounds directly from the metal, and the present invention is specific to the production of iron compounds.

My invention has for its object to provide a new method and procedure for converting ferrous bodies into ferrous compounds which may be operated selectively to produce oxides and compounds of different kinds.

My invention may be explained in connection with the accompanying drawing illustrating an apparatus for use in practicing the method, and in which the figure is a view partly in section and partly in elevation and of a more or less schematic character.

In the drawing, 2 designates an enclosed vessel or reactor, preferably rectangular in shape, having a trunnion 3 at one end of which is a pulley 4 by means of which the vessel may be rotated. The vessel has a cover member 5 removably sealed thereto so as to be liquid and gas-tight, but which affords access to the interior of the vessel for charging and discharging the contents of the vessel. The vessel is also shown as having a drain valve 7.

At the other end of the vessel is a hollow trunnion 8 having a gland 9 into which a gas supply pipe 10 is entered. This pipe 10 is provided with a cut-off valve 11, a drain valve 12, a pressure regulating valve 13, and an extension 14. With this arrangement the vessel may be selectively connected through a pressure regulator and manifold to one or another gas storage vessel 15, so that when one vessel is exhausted, another may be used while the first is replaced, or when necessary, two different gases may be supplied simultaneously or successively to the reactor.

In the drawings, spray nozzles 20 are shown for directing jets of cooling fluid against the outside of the drum. The drum may be provided with heat dissipating fins, not shown, to accelerate the rate of heat transfer. Water, or even air currents, may be directed through the nozzles. Other nozzles 21 may also be provided for directing a heating fluid such as steam against the reactor. It will be apparent that various other temperature regulating or modifying means may be used.

In the operation of the device, the metal to be processed is charged into the drum. The corrosive liquid or electrolyte is then introduced into the reactor until the reactor is preferably from a half to two-thirds full, after which the lid 5 is sealed shut. The reactor is then set into rotation, and gas is admitted to build up and maintain a desired pressure therein. After a period of time, depending upon the metal, the amount of metal and the product to be produced, the reactor is stopped and opened. The metallic compound is present in the bottom of the reactor as a sludge of very small particles. Usually the valve 7 is opened and the contents of the reactor are run into a thickener or filter to separate out the metallic compound which is subsequently washed and dried, while the electrolyte from which the compound is separated or filtered is kept for reuse in the reactor. It will be found that during the reaction the metal compound is continuously formed and precipitated without exhaustion of the electrolyte, and that no matter how long the electrolyte is used, it will remain active.

With the reactor about one foot in diameter and about six inches long revolving at 72 R. P. M., the following are typical examples of my method.

Example 1

A solution was prepared with 300 grams of commercial ammonium chloride and 2700 cc. of water. This was put into the reactor with enough iron scrap to fill the reactor about two-thirds full. Oxygen was supplied during reaction at about 7 p. s. i. pressure. Very finely divided red iron oxide was produced. The electrolyte was reused for the treatment of other iron. The temperature reached was approximately 165° F., no control being used. Magnetic black iron oxide may be produced with slight variation of this procedure, which consisted in cutting off the oxygen after red oxide had been produced, whereupon $Fe_2O_3$ with additional unreacted iron in the reactor iron formed $Fe_3O_4$. Instead of using a solution of ammonium chloride, a corrosive liquid was prepared using sodium chloride.

Example 2

A solution was prepared using 300 grams of commercial ammonium chloride and 2700 cc. of water. It was put in the reactor with iron scrap. Instead of oxygen, chlorine was introduced into the reactor, and maintained at a pressure about or slightly above 5 p. s. i. Iron chloride in finely divided form was precipitated. The electrolyte was successfully reused.

The same procedure may be followed using sodium chloride as the corrosive agent, or by using HCl or $H_2SO_4$ solution, it being desirable where an acid is used as the corrosive agent, to keep the reactor open during the initial reaction while hydrogen is being generated.

In the above example, fluorine may be used in place of chlorine, to produce fluorides. Other gases are $SO_2$ and $SO_3$. The gas in each case must be an active one, that is, one which may form salt or compounds of the metal to be converted, and the inert gases, such as helium, argon, neon, etc. are not suitable. Gases such as HCl or $H_2S$ are not used, because their reaction with metal will occur directly and hydrogen is liberated. The gas therefore is one which may be combined with metal, but which is entering into the combination does not itself decompose to yield hydrogen or other gas.

In all cases, I have found that the electrolyte is one which is corrosive to the metal to be converted into a compound, or is a solvent for the compound to be produced. In all cases the metal compound is constantly precipitated and new compound is constantly formed so that the electrolyte is not exhausted and continues to be usable indefinitely, only the gas in the reactor being consumed. The process is preferably a cyclic one in which the electrolyte is used over and over, and the solution loss during each cycle should not exceed more than 3%.

With my invention a relatively small compact plant can produce metallic compounds of a high quality and very fine particle size more rapidly and with a much less expense for plant outlay and materials than plants using conventional leaching methods.

Wetting agents such as "Aerosol" may be used, particularly when the metal to be processed is dirty or greasy. In the examples given above I have indicated amounts and pressures which I have found to be satisfactory, but these are not critical and may be varied within wide limits with some resulting change in the speed of reaction or the quality of the oxide in some cases, and while I have indicated that the gas pressure be above atmosperic pressure in the reactor, it is possible to operate with less than atmospheric pressure. Pressures are preferably kept below 60 p. s. i., and pressures of the magnitude indicated as around 5 to 7 p. s. i. are quite satisfactory. For the purpose of efficiency, I have indicated that the reactor be from one-half to two-thirds full, but this again is not critical. There is no advantage in operating it with too small a charge, and if the reactor is too full, the alternate exposure of the metal to the gas and its subsequent immersion is less effective.

I claim:

1. The method of converting iron in chunk-like pieces into inorganic iron compounds which comprises placing the pieces of iron in an environment closed against the escape of gas and vapors, introducing into said environment a solution of a compound of the group consisting of ammonium chloride, sodium chloride and mixtures thereof in a volume sufficient to provide a bath into and from which the iron may be tumbled, introducing into said environment a gas of the group conisting of oxygen, chlorine and fluorine, and tumbling the iron and solution while replenishing the gas as it is consumed to convert the iron into a precipitated inorganic compound in which it is combined with the gas and the potency of the solution is unaffected.

2. The method of converting iron into ferric oxide which comprises introducing pieces of iron into an environment closed against the escape of gas and vapors, introducing with the metal an aqueous solution of ammonium chloride, tumbling the metal in the liquid and introducing into the closed environment commercial oxygen, thereby continuously forming and precipitating ferric oxide.

3. The method defined in claim 2 wherein the supply of oxygen is subsequently shut off and the tumbling operation continued to selectively convert the ferric oxide to a lesser oxide.

References Cited in the file of this patent

UNITED STATES PATENTS

| | | |
|---|---|---|
| 2,339,793 | Moeklebust et al. | Jan. 25, 1944 |
| 2,339,808 | Ravnestad et al. | Jan. 25, 1944 |